US007617580B2

(12) United States Patent
Ellis

(10) Patent No.: US 7,617,580 B2
(45) Date of Patent: Nov. 17, 2009

(54) CONNECTOR REMOVAL TOOL

(76) Inventor: Ryan C. Ellis, 1000 Gladstell Rd., Conroe, TX (US) 77304

( * ) Notice: Subject to any disclaimer, the term of this patent is extended or adjusted under 35 U.S.C. 154(b) by 345 days.

(21) Appl. No.: 11/286,997

(22) Filed: Nov. 28, 2005

(65) Prior Publication Data

US 2007/0119038 A1 May 31, 2007

(51) Int. Cl.
*B23P 17/00* (2006.01)
*B25B 27/00* (2006.01)

(52) U.S. Cl. .............................. 29/237; 29/270; 29/268

(58) Field of Classification Search ................... 29/237, 29/267, 268, 270, 278; 269/3, 6; 81/300, 81/302, 418, 424.5, 426
See application file for complete search history.

(56) References Cited

U.S. PATENT DOCUMENTS 4,316,315 A 2/1982 Vogelnik et al.
4,947,901 A 8/1990 Rancour et al.
5,048,575 A 9/1991 Smith
5,125,296 A 6/1992 Nelson et al.
5,566,726 A 10/1996 Marelin
5,713,249 A 2/1998 Liversidge et al.
5,975,150 A 11/1999 Barsalov et al.
5,979,032 A * 11/1999 Roy et al. ..................... 29/237
6,324,884 B1 12/2001 Barjesteh et al.
6,862,766 B2 11/2003 Guerts
6,715,335 B2 4/2004 Huebner et al.
6,729,104 B2 5/2004 Marshall
6,817,075 B1 11/2004 Kretzschmar
6,889,579 B1 5/2005 Brown
2005/0066504 A1 3/2005 Duszynski et al.
2007/0119038 A1* 5/2007 Ellis ............................ 29/270

* cited by examiner

*Primary Examiner*—Lee D Wilson
(74) *Attorney, Agent, or Firm*—Gary M. Machetta

(57) ABSTRACT

A portable, hand held tool used for the controlled separation of tubing and connectors with radial claws and release buttons. The tool consists of a main handle, support handle and grasping handle. The main handle has an extension spring which returns the tool to a closed position when at rest. The main handle also has chuck receiver to allow the attachment of various sizes of chucks. A grasping jaw is located on the support handle and is operated by the grasping handle. The handles are connected near the middle of the tool utilizing a main pivot pin and a grasping pivot pin allowing the tool to grasp the tubing and causing the chuck and grasping jaw to separate relative to one another.

5 Claims, 5 Drawing Sheets

CONNECTOR REMOVAL TOOL

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "SEQUENCE LISTING" A TABLE, OR A COMPUTER PROGRAM LISTING APPENDIX SUBMITTED ON A COMPACT DISC

Not Applicable

BACKGROUND OF THE INVENTION

1. Field of the Invention

This invention relates to a hand tool used for removing connectors with radial claws and a release button from thermoplastic, nylon or copper tubing by depressing the release button and forcing the connector and tubing apart.

2. Description of Related Art

Various manufacturers provide one-piece connectors for attaching to thermoplastic, nylon or copper tubing in low to medium pressure hydraulic or pneumatic circuits used in transportation as well as other applications. These connectors often have a release button and retractable radial claws. These claws bind the connector to the tubing. These connectors are designed for applications where fast assembly, disassembly and reassembly are important. Various size connectors are used in assorted applications.

These connectors were designed to be disassembled without tools. However, in field applications disassembly is difficult due to 1) the residual pressure within the tube, 2) the proximity to obstructions and hazardous conditions including hot machinery parts, 3) the accumulation of foreign debris (dirt, grease, oil) that makes it difficult to grasp the connector and tubing, 4) the space limitations experienced when working in many field applications and 5) the accumulation of dirt and oil on a technicians hands.

The current method of removing these connectors is a two-handed process. It is accomplished by first grasping the connector with the first hand and the tubing with the second hand. Next, the second hand is then used to push the tubing further into the connector to release the radial claws from the tubing. Then, using the thumb and first two fingers of the first hand, retract the release button which further retracts and holds the radial claws away from the tubing. This allows the second hand to remove the tubing from the connector. This requires clean tubing and a clean connector that allows for traction (ability to grasp without slipping), proximity to the work area and ample space within the work area to release the connector from the tubing.

Pliers and other tools are currently designed and used for a variety of other special purposes for assembly and disassembly of connectors. Some are pneumatically powered, requiring a power source. Others are bench mounted, reducing their usefulness for lack of portability. Some tools exist to remove plastic insulation, remove circlips, attach banding straps and attach crimped connectors to tubing. None of these can be used for the controlled removal of connectors with radial claws from thermoplastic, nylon or copper tubing without damage to the connector and/or tubing. In addition, no existing tools allow for adjusting to various size connectors nor designed for single hand use.

BRIEF SUMMARY OF THE INVENTION

This present invention is a hand tool used for removing connectors with radial claws and a release button from thermoplastic, nylon or copper tubing. This tool is operated manually by one hand. The operator cradles the invention in one hand encompassing all three handles; the main handle, support handle, and the grasping handle. The main handle consists of a front end and a rear end. The front end has a flat chuck receiver. The chuck receiver has a receiving hole which mates to the shaft of the chuck. The chuck may be permanently attached to the receiving hole or removable. The preferred method is for the chuck to be removable. The rear end has a rubber-like or plastic-like grip. The main handle has a pair of main parallel plates connected by a top plate. The main handle is connected to the support handle by a main pivot pin inserted in a main pivot pin hole within each main parallel plate. The main parallel plate and bottom plate creates a main cavity within the main handle. Inside this main cavity is an extension spring connected at the fixed end to a hook and at the extending end to a support plate hook.

The support handle consists of two support parallel plates and a top forming a support cavity. The support handle has a front end and a rear end. The rear end is covered by a rubber-like or plastic-like grip. The grasping handle is formed by grasping opposing plates describing a rounded contact surface. The grasping handle is connected to the support handle by a grasping pivot pin inserted into a grasping pivot pin hole in each opposing plate. A support plate is mounted on the grasping pivot pin and has a support plate hook which attaches to the extending end of the extension spring. The support plate is tensioned against a support pin. The support pin is located below and to the rear of the grasping pivot pin.

With a connector removal tool using a removable chuck, the operator must insert the appropriate sized chuck onto the chuck receiver by placing the shaft of the chuck into the receiving hole. The chuck receiver is a flat surface with the receiving hole. These chucks can be fabricated in a range of sizes and assorted shapes. These chucks are used to make the tool usable for a range of tubing diameters. These chucks have a mating surface for stability when attached to the chuck receiver at the front end of the main handle. This flat mating surface has a shaft of a matching shape and diameter as the receiving hole at the front end of the main handle. The shaft preferably has a hexagonal shape with a diameter of three-sixteenths of an inch, possibly varying from one-eighth to three-eighths of an inch in diameter to ensure a tolerance fit. The length is between a quarter and three-quarters of an inch for stability and preferably one-half inch. The preferred shape of the chuck has the hollow centered opposite the shaft. The chucks have sides and are open at the top. The hollow created by the open top is preferably U-shaped but can be other shapes including C-shaped and V-shaped and includes an arc at the bottom to allow the chuck to fit snugly against tubing and with a contact surface perpendicular to the arc to act against the connector release button. The chuck is preferably one of a range of sizes with a hollow having an inner diameter from an eighth of an inch to one inch. The connector removal tool is dual actuating, allowing in one continuous hand motion the grasping jaw to tighten around the tubing and the chuck to move against the release button of the connector which forces the radial claws to retract, allowing the tubing to separate from the connector.

The operator places the grasping jaw over the tubing, cradling the tubing in the arc of the chuck and placing the chuck closest to the release button. The tool in its entirety is placed on one side of the connector. The operator then compresses the grasping handle which pushes the extension shaft forward. This raises the bottom end of the grasping jaw toward the top end of the grasping jaw located at the overhang causing the top grasping surface and the bottom grasping surface of the bottom end to firmly hold the tubing. The top and bottom grasping surfaces preferably have a pattern to facilitate traction with the tubing including parallel lines. The top and bottom grasping surface could also include diamonds or raised dots. The operator further compresses the support handle and main handle which distances the chuck from the grasping jaw. The contact surface of the chuck then compresses the release button, retracting the radial claw and separating the connector from the tubing.

This device allows for use with a single hand enabling the operator to separate the connector and tubing in confined areas. Assorted chucks and the grasping jaw allow for use with a range of tubing diameters and connector sizes. This invention can be used effectively regardless of the cleanliness of the connector and tubing. The design increases mechanical advantage and applies additional force to release the connector allowing separating of very tight, difficult to remove connectors from tubing. The invention provides a controllable separation of the connector and tubing minimizing possible injury as well as damage to connector and tubing allowing for re-use.

BRIEF DESCRIPTION OF THE SEVERAL VIEWS OF THE DRAWING(S)

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiment set forth herein; rather, these embodiments are provided so that this disclosure will be thorough and complete, and will fully convey the scope of the invention to those skilled in the art. Like numbers refer to like elements throughout.

Figure 1:
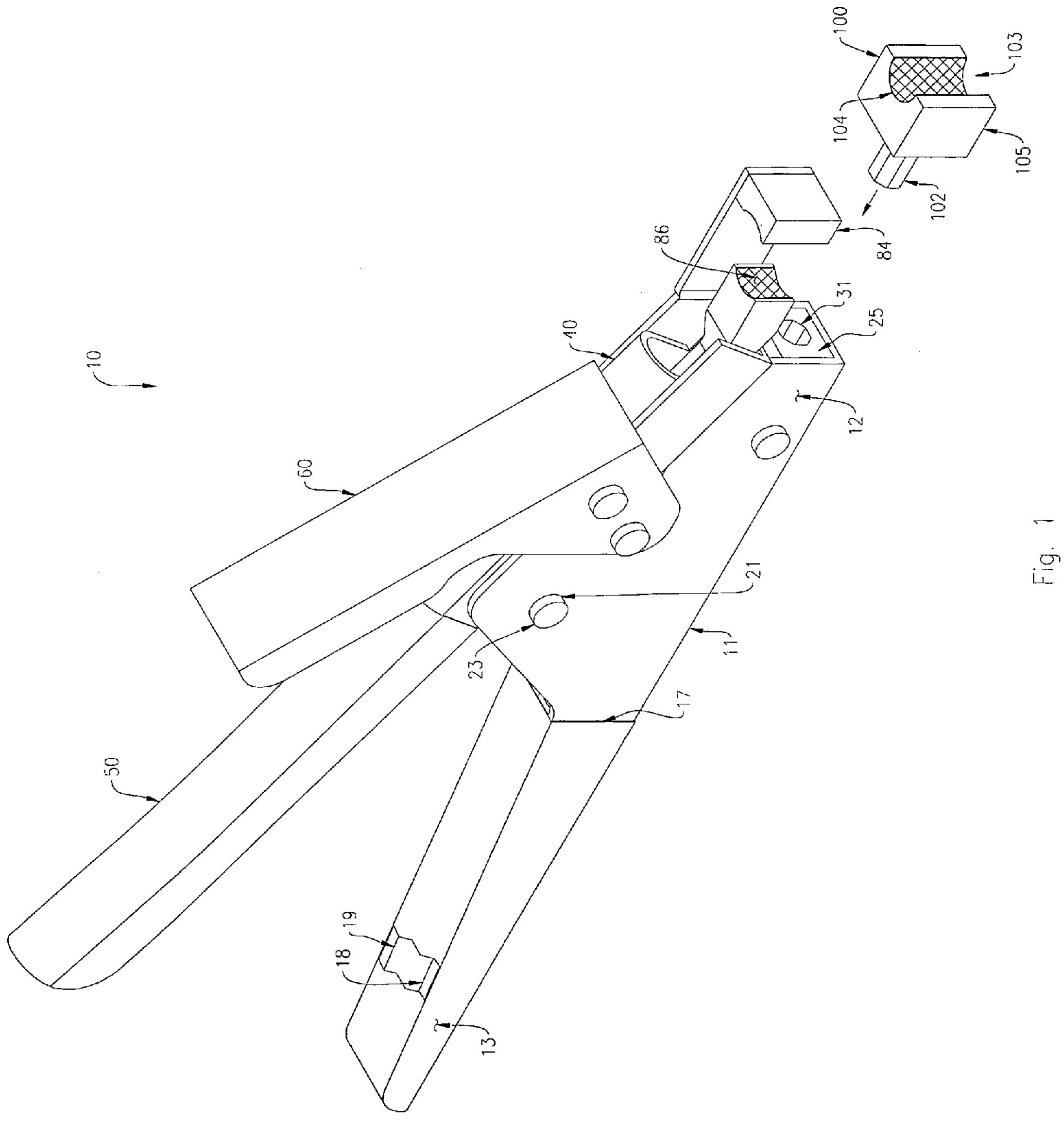
FIG. 1 is a front perspective view of the described invention.

FIG. 1 shows the connector removal tool 10 with a main handle 11, support handle 40 and grasping handle 60. Main handle 11 has a front end 12 and a rear end 13. The rear end 13 tapers slightly from the front end 12. The rear end 13 includes a rubber-like or plastic-like grip 17 covering about half of the main handle 11. The support handle 40 includes a rubber-like or plastic-like grip 50. The main handle 11 has a pair of main parallel plates 18 and 19. The main parallel plates 18 and 19 are formed similarly. Main pivot pin hole 21 is shown on the main handle. Main pivot pin 23 connects the main handle 11 to the supporting handle 40. The chuck receiver 25 with a centered receiving hole 31 is located at the front end 12 of the main handle 11. The receiving hole 31 allows the chuck 100 to be attached to the front end 12 of the main handle 11 by insertion of a centered shaft 102. The chuck 100 is shown with the contact surface 105 and an arc 104 which creates a hollow 103. The arc 104 is located opposite the shaft. The bottom grasping surface 86 and overhang 84 are shown.

Figure 2:
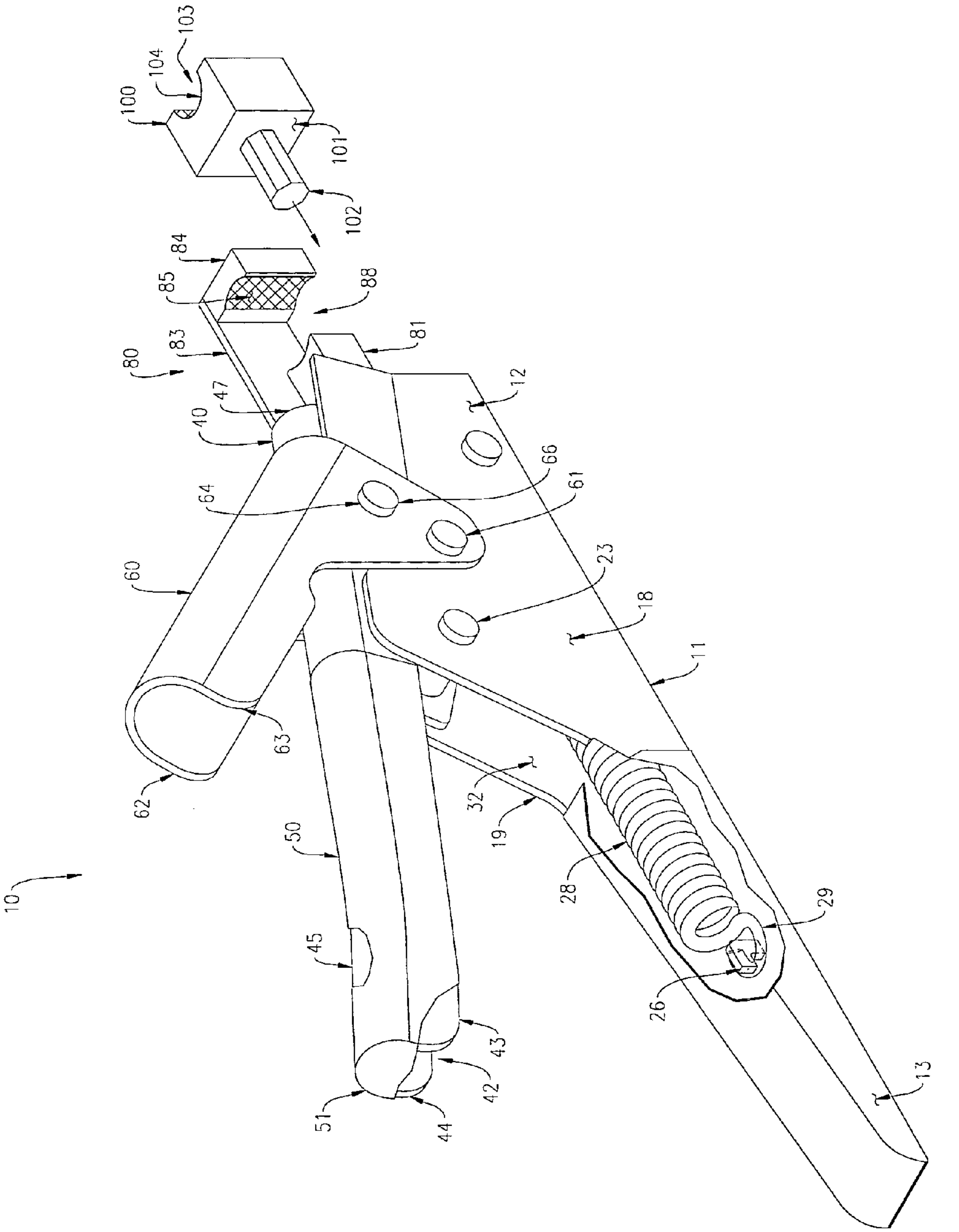
FIG. 2 is a rear perspective view of the described invention showing some internal details of the main handle.

FIG. 2 shows the connector removal tool 10 with a grasping handle 60, the support handle 40 and the main handle 11. The main handle 11 has a front end 12 and rear end 13. The main parallel plates 18 and 19 create a main cavity 32. The main cavity 32 contains an extension spring 28 in the main handle 11. The extension spring 28 is attached at the fixed end 29 to the hook 26 at the rear end 13 of the main handle 11. The support handle 40 is pivotally and swingably connected to the main handle 11 using a main pivot pin 23. The support handle 40 has a front end 47 and a rear end 51 with rubber-like or plastic-like grip 50. The support handle 40 has two support parallel plates 43 and 44 and a top 45 forming a support cavity 42. The grasping handle 60 is pivotally and swingably connected to the support handle 40 by a grasping pivot pin 66. The grasping handle 60 is somewhat L-shaped, formed by a pair of grasping opposing plates 62 and 63 extending over the main parallel plates 18 and 19 of the main handle 11 and support parallel plates 43 and 44 of the support handle 40. A grasping pivot pin 66 is affixed in grasping pivot pin hole 64 in the plate 63 of the grasping handle 60. A support pin 61 is shown in the grasping handle 60. The grasping jaw 80 shows a top end 83, an extension shaft 81, an overhang 84 and an opening 88. The-top grasping surface 85 is located at the top end 83. The chuck 100 is shown with the shaft 102 attached to the mating surface 101. The arc 104 and hollow 103 are at the end of the chuck.

Figure 3:
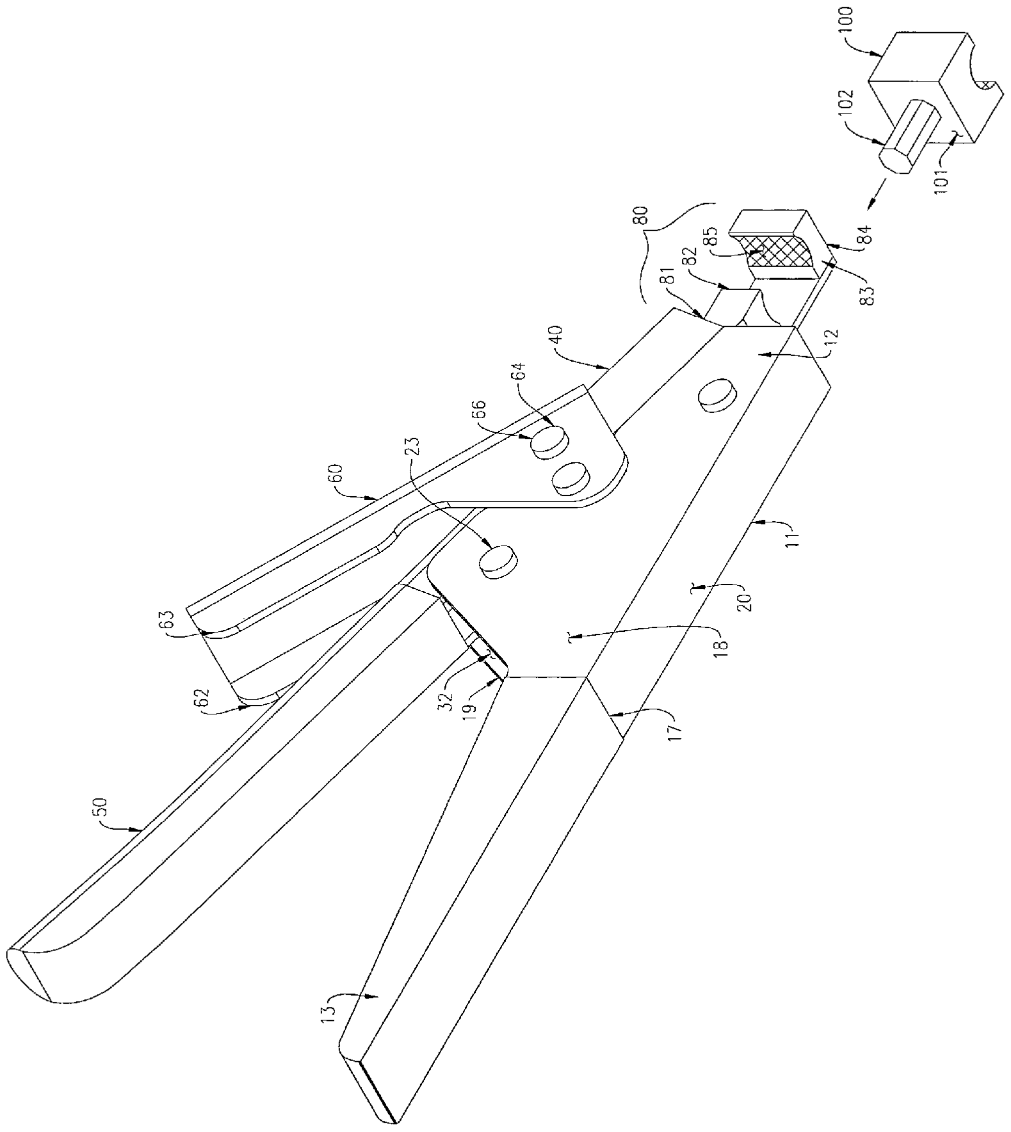
FIG. 3 is a bottom perspective view of the described invention showing a chuck separated from the rest of the invention.

FIG. 3 is a bottom perspective view of the invention showing the grasping handle 60, the support handle 40 and the main handle 11. The main handle 11 has a front end 12 and rear end 13. The grasping handle 60 is pivotally and swingably connected to the support handle 40 by a grasping pivot pin 66. The grasping handle 60 is somewhat L-shaped, formed by a pair of grasping opposing plates 62 and 63 extending over the main parallel plates 18 and 19 of the main handle 11. The main parallel plates 18 and 19 and the bottom plate 20 form a main cavity 32. The main handle 11 includes a rubber-like or plastic-like grip 17. The support handle 40 has a rubber-like or plastic-like grip 50. A grasping pivot pin 66 is affixed in grasping pivot pin hole 64 in the plate 63 of the grasping handle 60. The support handle 40 is pivotally and swingably connected to the main handle 11 using a main pivot pin 23. The grasping jaw 80 consists of a bottom end 82, a top end 83, an extension shaft 81 and an overhang 84. The top grasping surface 85 is located at the top end 83. The chuck 100 is shown with the shaft 102 attached to the mating surface 101.

Figure 4:
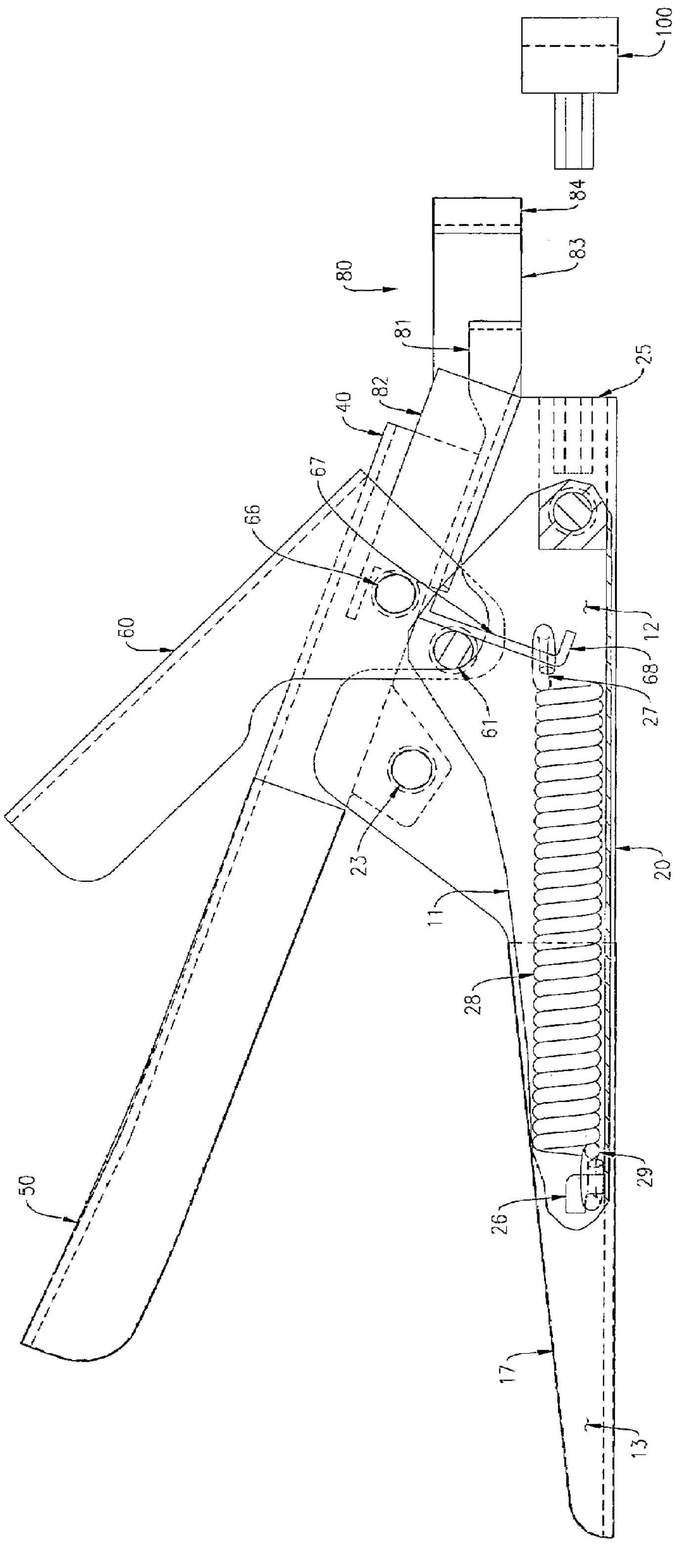
FIG. 4 is a sectional view of the invention showing the internal parts of the invention.

FIG. 4 is a sectional view showing the grasping handle 60, the support handle 40 and the main handle 11. The main handle 11 has a front end 12 and rear end 13. The grasping handle 60 is pivotally and swingably connected to the support handle 40 by a grasping pivot pin 66. The support plate 67 is connected to the grasping pivot pin 66 and rests on support pin 61. The main handle 11 is attached to the support handle 40 using a main pivot pin 23. A bottom plate 20 is shown. The main handle 11 includes a rubber-like or plastic-like grip 17. Thesupport handle 40 has a rubber-like or plastic-like grip 50. The grasping jaw 80 consists of a bottom end 82, a top end 83, an extension shaft 81 and an overhang 84. The extending end 27 of the extension spring 28 is connected to the support plate hook 68. The support plate hook 68 is formed at the end of the support plate 67. The fixed end 29 of the extension spring 28 is attached to the hook 26 located at the rear end 13 of the main handle 11. The chuck 100 is shown attached to the chuck receiver 25.

Figure 5:
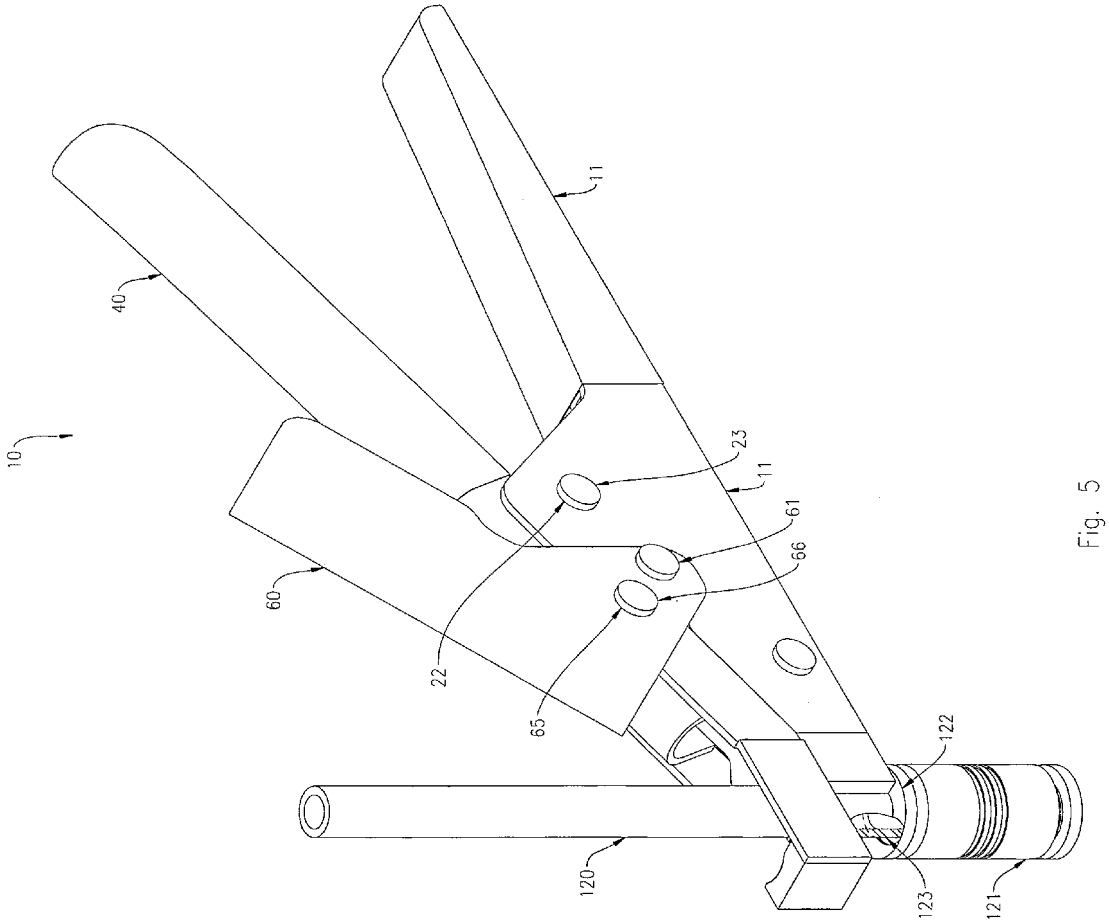
FIG. 5 is a perspective view of the invention showing the relationship with the tubing and connector.

FIG. 5 is a perspective view of the invention showing the relationship with the tubing and connector. The connector removal tool 10 with a main handle 11, support handle 40 and grasping handle 60 are shown. Main pivot pin hole 22 is shown on the main handle 11. Main pivot pin 23 connects the main handle 11 to the support handle 40. The support pin 61 and grasping pivot pin 66 are shown on the grasping handle 60. Grasping pivot pin 66 is located in grasping pivot pin hole 65 on the grasping handle 60. The tubing 120 with a connector 121 attached are shown. The connector 121 has a release button 122 which when acted upon retracts radial claws 123 and releases the tubing 120 from the connector 121.

What is claimed is:

1. A connector removal tool comprising:

a main handle, a support handle, a grasping handle and a chuck;

said main handle having a front end and a rear end;

said front end having a chuck receiver with a receiving hole at said front end of said main handle;

said chuck having a mating surface and a contact surface;

said mating surface of said chuck attached to said chuck receiver;

said chuck having said contact surface opposite a grasping jaw;

said mating surface including a shaft extending outward for attachment to said chuck receiver and said receiving hole;

said main handle having a pair of main parallel plates and a bottom plate integrally connected to said main parallel plates to form a main cavity;

said main cavity having an extension spring with a fixed end attached to a hook and an extending end attached to a support plate hook;

said main handle having a main pivot pin located in two opposing main pivot pin holes;

said support handle pivotally and swingably connected to said main handle;

said support handle having a front end and rear end;

said support handle having a pair of support parallel plates and a top integrally connected to said support parallel plates to form a support cavity;

said support handle mounted to said main handle using said main pivot pin;

said support handle having a grasping jaw at said front end;

said grasping jaw consists of an extension shaft which moves a bottom end;

said bottom end having a bottom grasping surface;

said grasping jaw having an overhang extending beyond the bottom end;

said overhang having a top end and a top grasping surface;

said grasping handle pivotally and swingably connected to said support handle by a grasping pivot pin;

said grasping handle formed by a pair of grasping opposing plates extending over the main parallel plates of said main handle such that the support handle is located between said main handle and said grasping handle;

said grasping handle contains a support plate attached to said grasping pivot pin; and said support plate rests against a support pin attached to said grasping handle.

2. The connector removal tool as recited in claim 1, wherein said chucks having a U-shape with a hollow;

said hollow having a dimension from a quarter inch to one inch across and said shaft being hexagonal in shape.

3. A connector removal tool comprising:

a main handle, a support handle, a grasping handle and a chuck;

said main handle having a front end and a rear end;

said front end having a chuck receiver with a receiving hole at said front end of said main handle;

said chuck having a mating surface and a contact surface;

said chuck capable of being removed from said chuck receiver;

said chuck having said contact surface opposite a grasping jaw;

said mating surface including a shaft extending outward for attachment to said chuck receiver and said receiving hole;

said main handle having a pair of main parallel plates and a bottom plate integrally connected to said main parallel plates to form a main cavity;

said main cavity having an extension spring with a fixed end attached to a hook and an extending end attached to a support plate hook;

said main handle having a main pivot pin located in two opposing main pivot pin holes;

said support handle pivotally and swingably connected to said main handle;

said support handle having a front end and rear end;

said support handle having a pair of support parallel plates and a top integrally connected to said support parallel plates to form a support cavity;

said support handle mounted to said main handle using said main pivot pin;

said support handle having a grasping jaw at said front end;

said grasping jaw consists of an extension shaft which moves a bottom end;

said bottom end having a bottom grasping surface;

said grasping jaw having an overhang extending beyond the bottom end;

said overhang contains a top end and a top grasping surface;

said grasping handle is pivotally and swingably connected to said support handle by a grasping pivot pin;

said grasping handle is formed by a pair of grasping opposing plates extending over the main parallel plates of said main handle such that the support handle is located between the main handle and the grasping handle;

said grasping handle contains a support plate attached to said grasping pivot pin; and said support plate rests against a support pin attached to said grasping handle.

4. The connector removal tool as recited in claim 3, wherein said chucks having a U-shape with a hollow;

said hollow having a dimension from a quarter inch to one inch across said hollow to guide said contact surface; and said shaft being hexagonal in shape.

5. The connector removal tool as recited in claim 3, wherein said chucks having a U-shape with a hollow;

said hollow having a dimension from a quarter inch to one inch across said hollow to guide said contact surface; and said shaft having a length of between an eighth on an inch and three eighths of an inch.

* * * * *